United States Patent
Tu et al.

(10) Patent No.: US 9,298,655 B2
(45) Date of Patent: Mar. 29, 2016

(54) BUS DETECTION AND CONTROL METHOD AND BUS DETECTION AND CONTROL DEVICE AND MOBILE INDUSTRY PROCESSOR INTERFACE SYSTEM THEREOF

(71) Applicant: NOVATEK Microelectronics Corp., Hsin-Chu (TW)

(72) Inventors: Wei-Ying Tu, Hsinchu (TW); Ching-Tsung Tung, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 406 days.

(21) Appl. No.: 13/927,117

(22) Filed: Jun. 26, 2013

(65) Prior Publication Data

US 2014/0136741 A1    May 15, 2014

(30) Foreign Application Priority Data

Nov. 13, 2012    (TW) .............................. 101142205 A (51) Int. Cl.
*G06F 13/364* (2006.01)
*H04L 29/14* (2006.01)

(52) U.S. Cl.
CPC .............. *G06F 13/364* (2013.01); *H04L 29/14* (2013.01)

(58) Field of Classification Search
CPC .............................. G06F 13/364; H04L 29/14
USPC ............. 710/110; 714/2, 3, 4.5, 49, 709, 746, 714/747, 799
See application file for complete search history.

(56) References Cited

U.S. PATENT DOCUMENTS

| | | | |
|---|---|---|---|
| 8,294,482 B2 | 10/2012 | Gettemy | |
| 8,924,611 B2* | 12/2014 | Harriman | G06F 1/12 710/105 |
| 9,015,393 B2* | 4/2015 | Korpinen | G06F 13/42 710/106 |
| 2007/0112990 A1 | 5/2007 | Hayashita | |
| 2010/0014437 A1 | 1/2010 | Wang | |
| 2010/0042874 A1* | 2/2010 | Lee | G06F 11/2221 714/27 |
| 2010/0225565 A1 | 9/2010 | Freitas | |
| 2014/0143588 A1* | 5/2014 | Leinonen | G06F 11/0742 714/2 |

FOREIGN PATENT DOCUMENTS

| | | |
|---|---|---|
| CN | 101634977 A | 1/2010 |
| CN | 102236630 A | 11/2011 |
| CN | 102354305 A | 2/2012 |
| JP | 2004297442 A | 10/2004 |
| TW | 201015484 | 4/2010 |
| TW | 201205276 | 2/2012 |

* cited by examiner

*Primary Examiner* — Glenn A Auve
(74) *Attorney, Agent, or Firm* — Winston Hsu; Scott Margo (57) ABSTRACT

A bus detection and control method for a mobile industry processor interface system is disclosed, wherein a host is coupled to a slave with a mobile industry processor interface bus. The bus detection and control method includes steps of detecting statuses of the mobile industry processor interface bus and the host, to output a control signal; and outputting one of a predefined signal corresponding to an initial state and a transmission signal outputted to the mobile industry processor interface bus by the host as a reception signal of the slave according to the control signal.

28 Claims, 11 Drawing Sheets

BUS DETECTION AND CONTROL METHOD AND BUS DETECTION AND CONTROL DEVICE AND MOBILE INDUSTRY PROCESSOR INTERFACE SYSTEM THEREOF

BACKGROUND OF THE INVENTION

1. Field of the Invention

The present invention relates to a bus detection and control method and a bus detection and control device thereof, and more particularly, to a bus detection and control method and a bus detection and control device thereof capable of forcing a slave to maintain in an initial state after a signal transmission error occurred in a mobile industry processor interface (MIPI) bus and wait for receiving a signal outputted by a host until the host also returns to the initial state, to prevent signal transmission errors.

2. Description of the Prior Art

With the development of science and technology, handheld devices such as smart phones, personal digital assistants (PDA), etc. integrate more and more communication and displaying techniques, to realize various application functions. In order to simultaneously control various application functions, it requires a high-speed processing interface between a processor and a display panel (i.e. between a host and a slave) of a smart handheld device, to speed up data transmission and thus improve display quality or touching functions of the panel. The mobile industry processor interface (MIPI) is a high-speed serial interface used widely in current industry. However, in the mobile industry processor interface system, the host and the slave may consider the status of a single mobile industry processor interface bus shared for data transmission between the host and the slave differently, which cause transmission errors.

Figure 1:
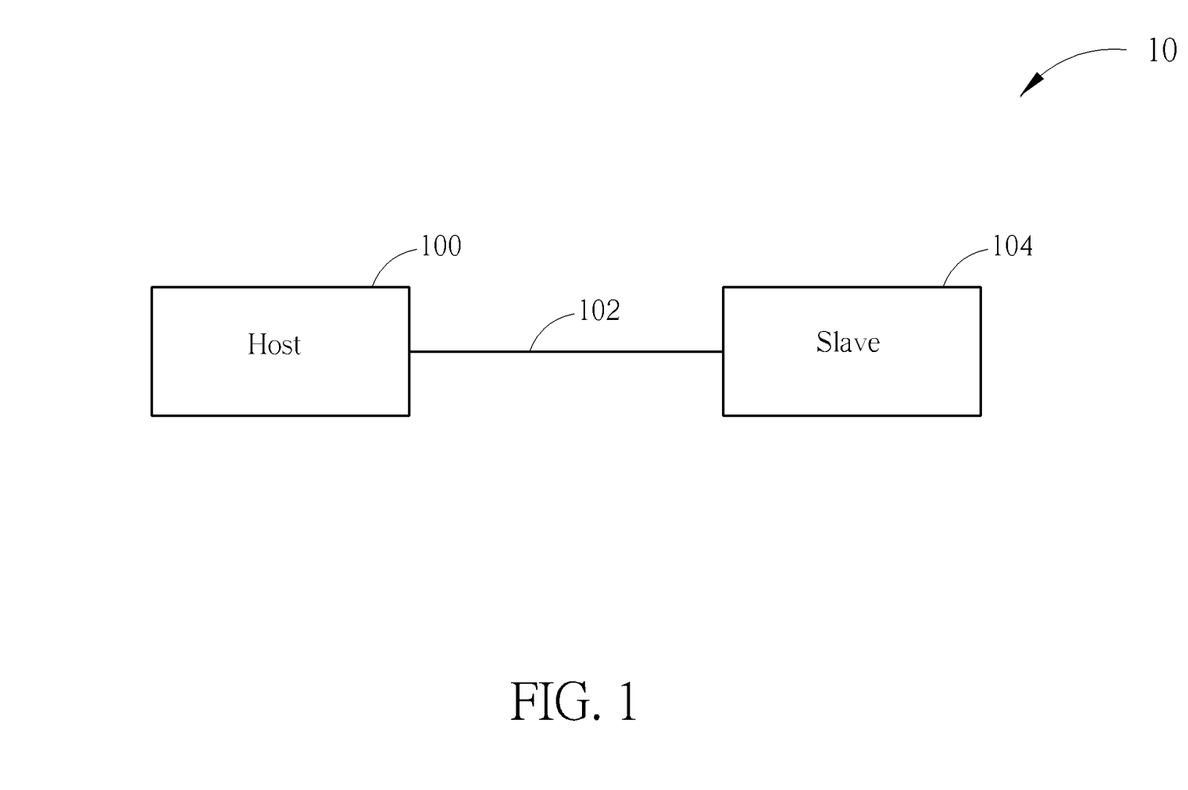
FIG. 1 is a schematic diagram of a conventional mobile industry processor interface system.

For example, please refer to FIG. 1, which is a schematic diagram of a conventional mobile industry processor interface system 10. As shown in FIG. 1, in the mobile industry processor interface system 10, a host 100 is coupled to a slave 104 with a mobile industry processor interface bus 102 for data transmission.

Figure 2A:
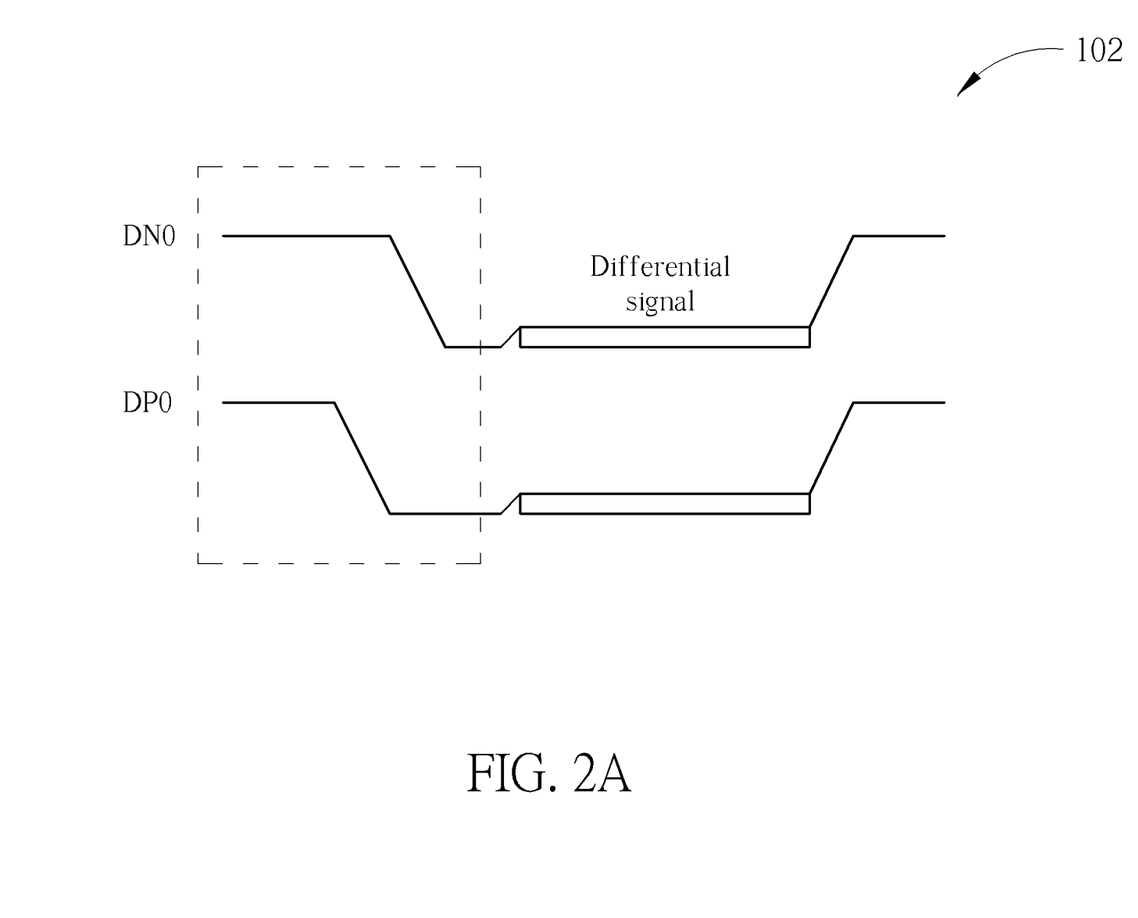
FIG. 2A is a signal diagram of a mobile industry processor interface bus when a host shown in FIG. 1 transmits high-speed differential signals.
Figure 2B:
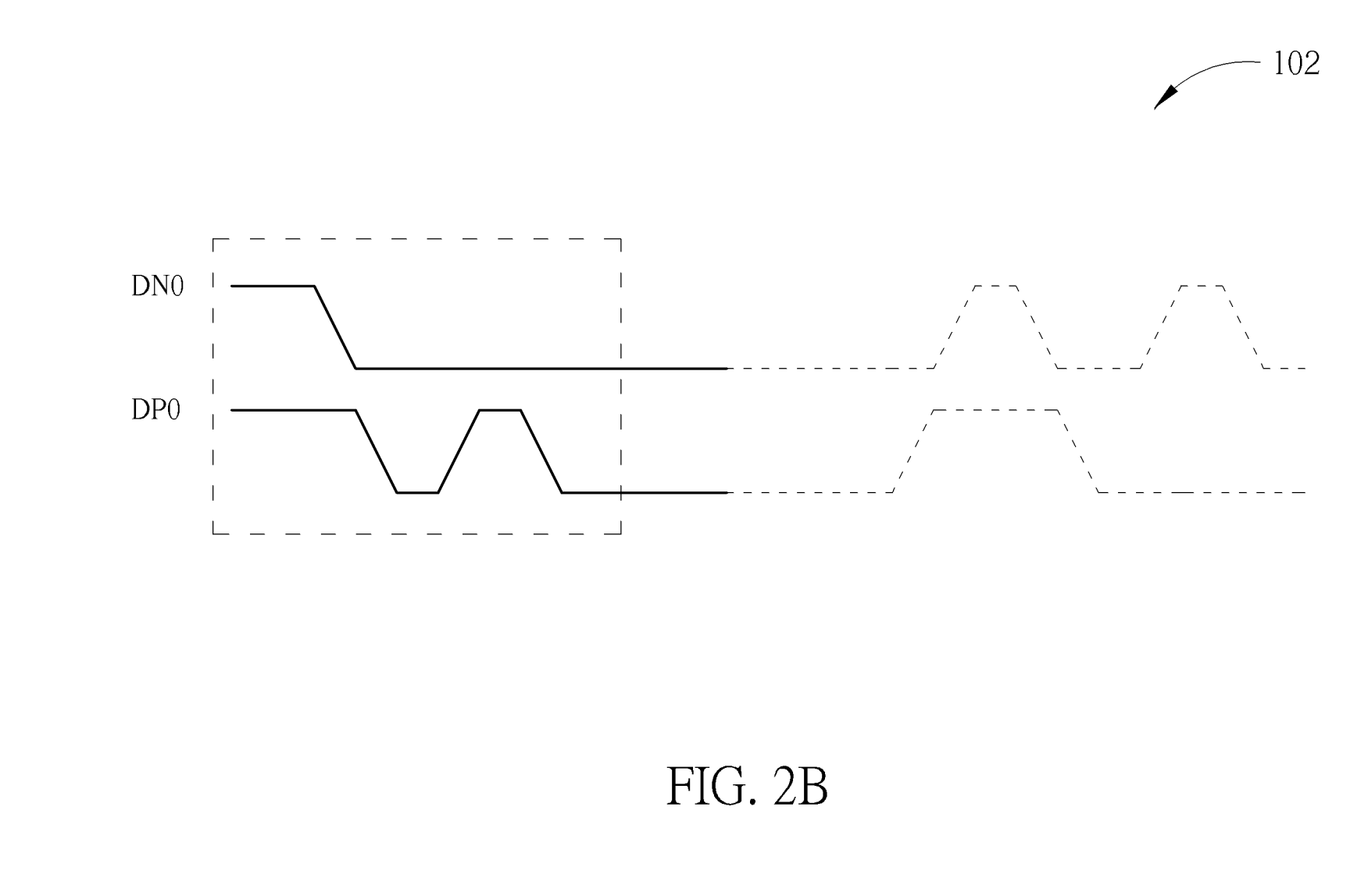
FIG. 2B is a signal diagram of the mobile industry processor interface bus when the host shown in FIG. 1 performs bus turnaround.
Figure 2C:
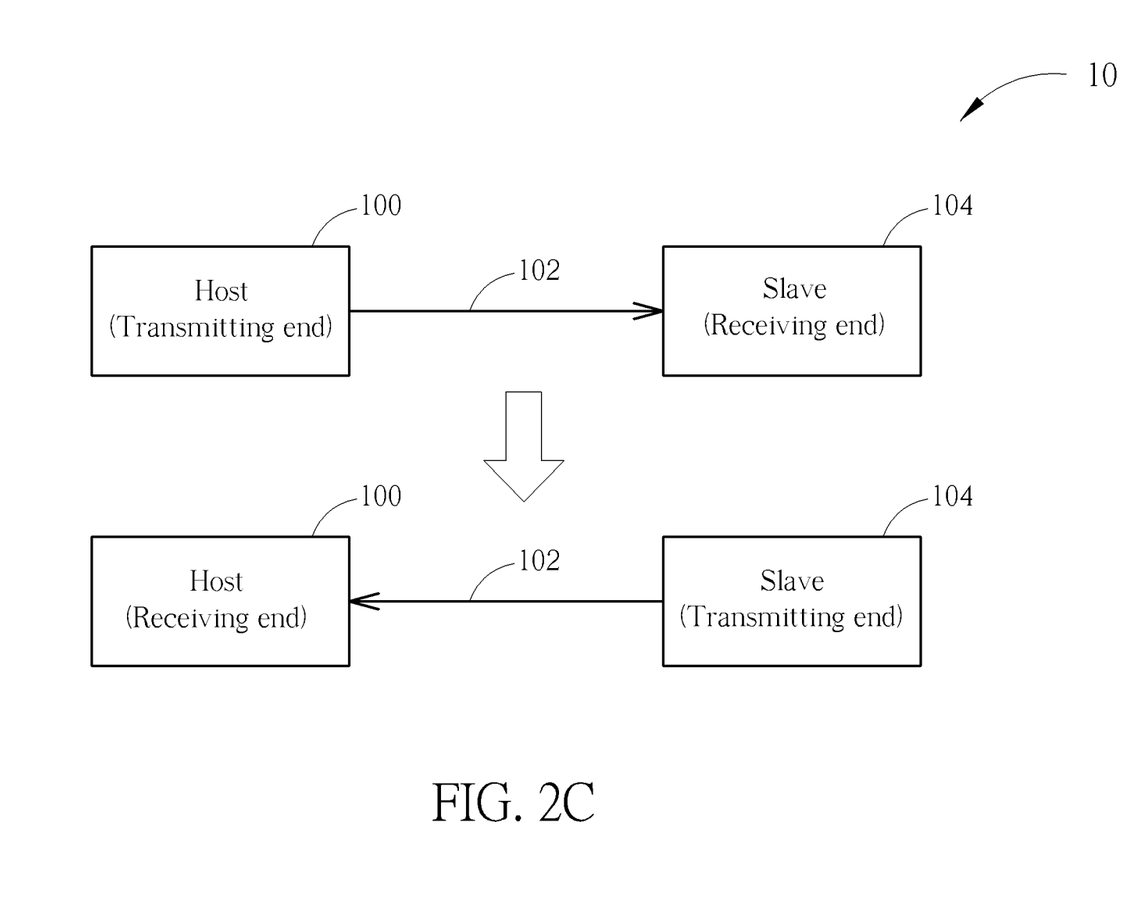
FIG. 2C is a schematic diagram of operations of the mobile industry processor interface system when the host shown in FIG. 1 performs bus turnaround.

For this structure, please refer to FIG. 2A to 2C. FIG. 2A is a signal diagram of a mobile industry processor interface bus 102 when the host 100 transmits high-speed differential signals. FIG. 2B is a signal diagram of the mobile industry processor interface bus 102 when the host 100 performs bus turnaround (BTA). FIG. 2C is a schematic diagram of operations of the mobile industry processor interface system 10 when the host 100 performs bus turnaround. As shown in FIG. 2A, the mobile industry processor interface bus 102 includes transmission lines DN0, DP0. First, when the host 100 and the slave 104 are in initial states and do not transmit data, the initial state of the mobile industry processor interface bus 102 is an LP11 stop state (i.e. both the transmission lines DN0, DP0 are with logic high in a low power transmission mode). Then, the host 100 transmits a high-speed transmission sequence as shown in the dotted frame of FIG. 2A which indicates the slave 104 that the host 100 is about to start transmitting high-speed differential signals to write instructions or data. Therefore, the slave 104 may be set to a high-speed transmission mode to receive high-speed differential signals transmitted by the host 100 and operate accordingly. When transmission of the high-speed differential signals is completed or a predefined high-speed transmission timer is time out, the mobile industry processor interface bus 102 returns to the LP11 stop state again (the host 100 and the slave 104 are also set to the initial state and do not transmit data).

On the other hand, as shown in FIGS. 2B and 2C, since the host 100 and the slave 104 share the mobile industry processor interface bus 102 for data transmission, the host 100 transmits a bus turnaround sequence shown in the dotted frame of FIG. 2B indicating the slave 104 that the host 100 starts reading back data when the host 100 intends to read back data or statuses of the slave 104. At this moment, the control authority over the mobile industry processor interface bus 102 is transferred to the slave 104, which means the host 100 and the slave 104 are set from a transmitting end and a receiving end to a receiving end and a transmitting end, respectively (as shown in FIG. 2C). Accordingly, the slave 104 transmits data or status signals required by the host 100 to the host 100 (shown as the dotted lines of the transmission lines DN0, DP0 in FIG. 2B).

Figure 3A:
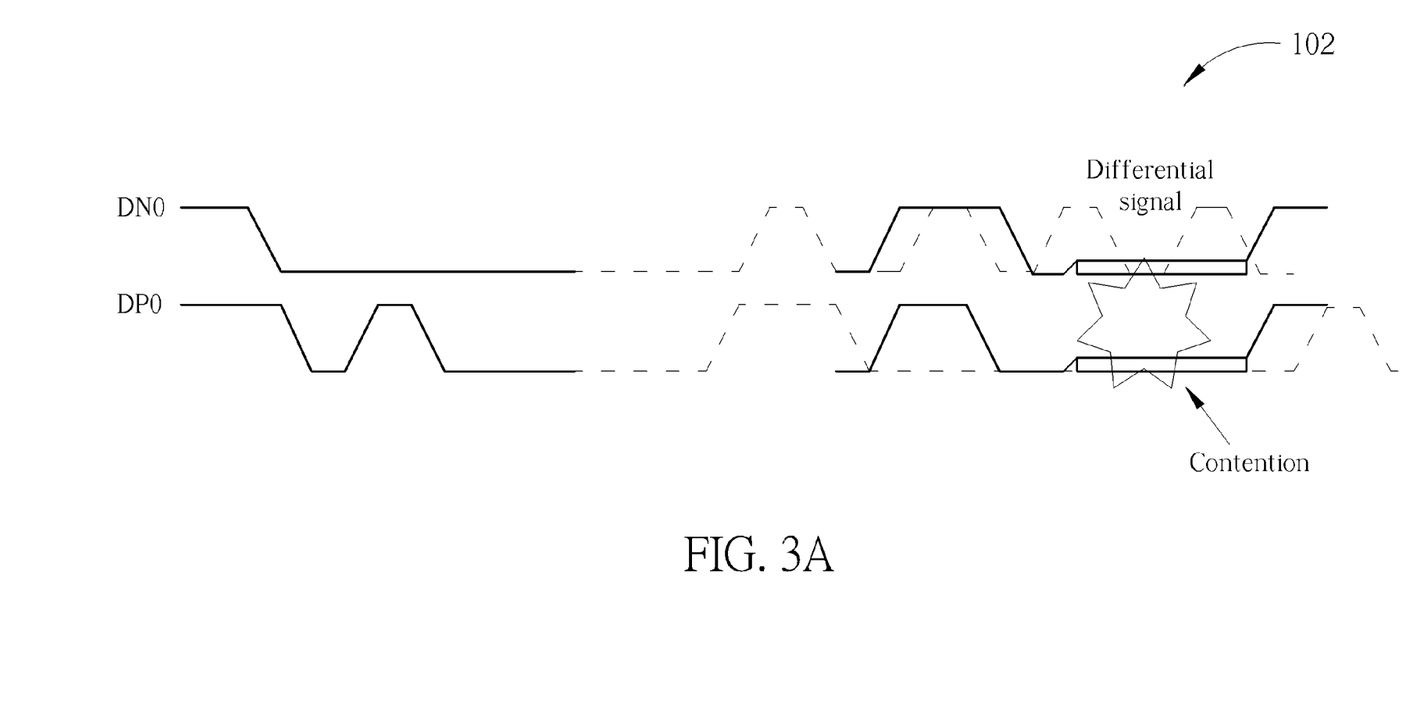
FIG. 3A is a signal diagram of contention occurred in the mobile industry processor interface bus when the host shown in FIG. 1 performs bus turnaround.
Figure 3B:
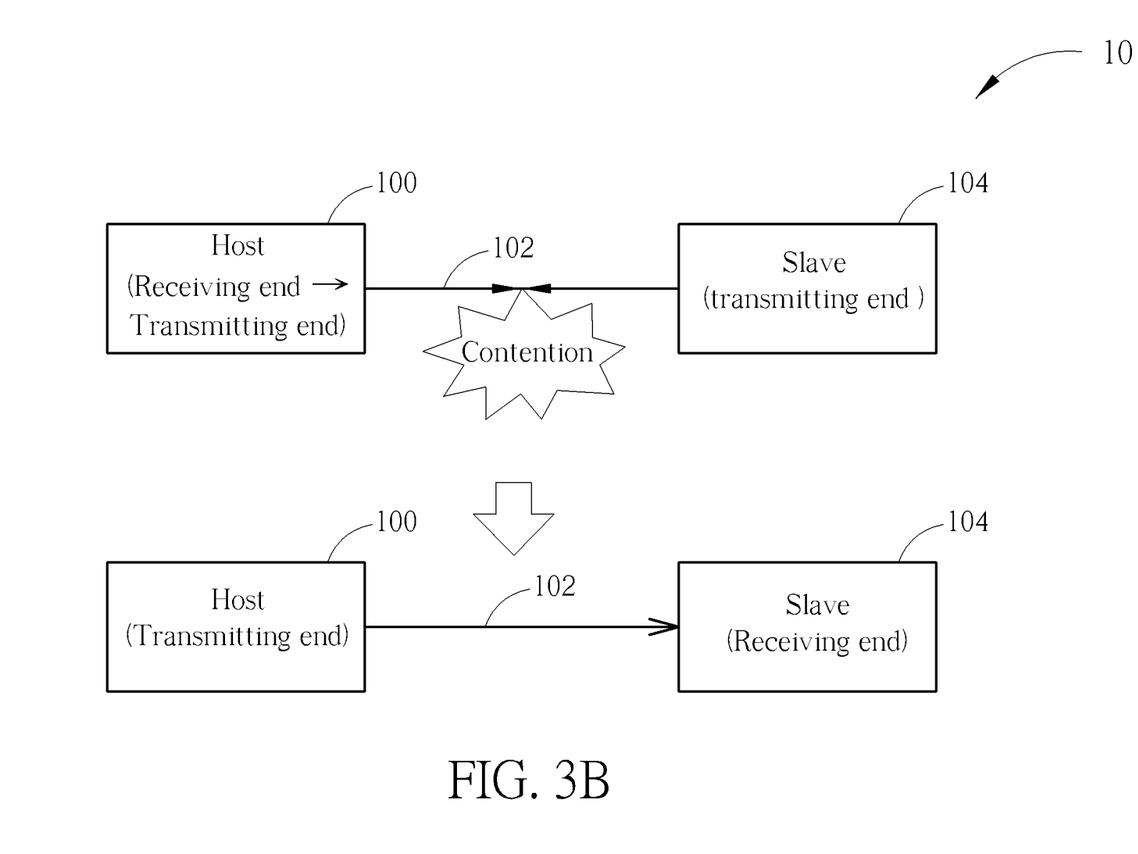
FIG. 3B is a schematic diagram of operations of the mobile industry processor interface system when contention occurred in the mobile industry processor interface bus shown in FIG. 1.

However, please refer to FIGS. 3A and 3B. FIG. 3A is a signal diagram of contention occurred in the mobile industry processor interface bus 102 when the host 100 performs bus turnaround. FIG. 3B is a schematic diagram of operations of the mobile industry processor interface system 10 when contention is occurred in the mobile industry processor interface bus 102. As shown in FIGS. 3A and 3B, when bus turnaround is completed such that the slave 104 has control authority over the mobile industry processor interface bus 102 and starts transmitting data to the host 100, if the host 100 incorrectly considers owning the control authority over the mobile industry processor interface bus 102 (the host 100 switches from the receiving end to the transmitting end by itself) and starts transmission (e.g. high-speed differential signal transmission as the latter parts of the solid lines of the transmission lines DN0, DP0 in FIG. 3B), signals transmitted from the host 100 to the slave 104 undergo contention against signals transmitted from the slave 104 to the host 100 in the mobile industry processor interface bus 102.

In such a situation, the slave 104 stops transmitting signals to the host 100 and returns to the initial state. However, since the host 100 continues data transmission at the same time, the slave 104 may incorrectly switch to other status from the initial state, which causes abnormal operations (e.g. the host 100 still continues transmitting high-speed differential signals as shown in FIG. 3A, or the host 100 transmits low power signals under other conditions such that the slave 104 operates abnormally).

Figure 4:
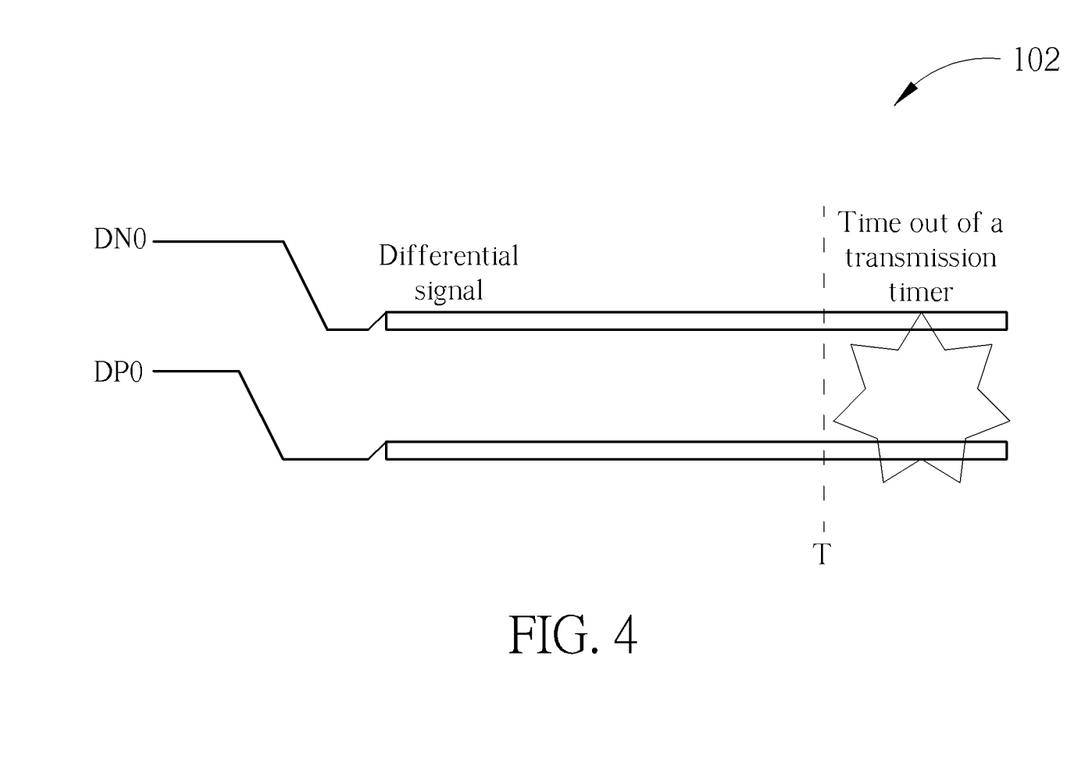
FIG. 4 is a signal diagram of the mobile industry processor interface bus when the host shown in FIG. 1 continues transmitting high-speed differential signals at time out of a transmission timer.

On the other hand, please refer to FIG. 4, which is a signal diagram of the mobile industry processor interface bus 102 when the host 100 continues transmitting high-speed differential signals at time out of a transmission timer. As shown in FIG. 4, the host 100 starts transmitting high-speed differential signals after transmitting a high-speed transmission sequence. After time out of the transmission timer at a time T, the host 100 should stop transmission and both the host 100 and the slave 104 should return to the initial state according to a specification. However, errors may be occurred in the host 100. The host 100 therefore continues transmitting high-speed differential signals, such that the slave 104 enters the high-speed transmission mode again and derives incorrect data.

As can be seen, the host and the slave in the prior art may consider the status of a single mobile industry processor interface bus shared for data transmission between the host and the slave differently (e.g. statuses of control authority or transmission timer), which causes transmission errors. Thus, there is a need for improvement of the prior art.

SUMMARY OF THE INVENTION

It is therefore an objective of the present invention to provide a bus detection and control method and a bus detection and control device thereof capable of forcing a slave to maintain in an initial state after a signal transmission error occurred in a mobile industry processor interface and wait for receiving a signal outputted by a host until the host also returns to the initial state, to prevent signal transmission errors.

The present invention discloses a bus detection and control method for a mobile industry processor interface system, wherein a host is coupled to a slave with a mobile industry processor interface bus. The bus detection and control method comprises detecting statuses of the mobile industry processor interface bus and the host, to output a control signal; and outputting one of a predefined signal corresponding to an initial state and a transmission signal outputted to the mobile industry processor interface bus by the host as a reception signal of the slave according to the control signal.

The present invention further discloses a bus detection and control device for a mobile industry processor interface system, wherein a host is coupled to a slave with a mobile industry processor interface bus. The bus detection and control device comprises a bus controller, for detecting statuses of the mobile industry processor interface bus and the host, to output a control signal; and a multiplexer, comprising a first input terminal receiving a predefined signal corresponding to an initial state and a second input terminal receiving a transmission signal outputted to the mobile industry processor interface bus by the host, for outputting one of the predefined signal corresponding to the initial state and the transmission signal outputted to the mobile industry processor interface bus by the host as a reception signal of the slave according to the control signal.

The present invention further discloses a mobile industry processor interface system. The mobile industry processor interface system comprises a slave; a mobile industry processor interface bus; a host, coupled to the slave with the mobile industry processor interface bus; and a bus detection and control device. The bus detection and control device comprises a bus controller, for detecting statuses of the mobile industry processor interface bus and the host, to output a control signal; and a multiplexer, comprising a first input terminal receiving a predefined signal corresponding to an initial state and a second input terminal receiving a transmission signal outputted to the mobile industry processor interface bus by the host, for outputting one of the predefined signal corresponding to the initial state and the transmission signal outputted to the mobile industry processor interface bus by the host as a reception signal of the slave according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 5A:
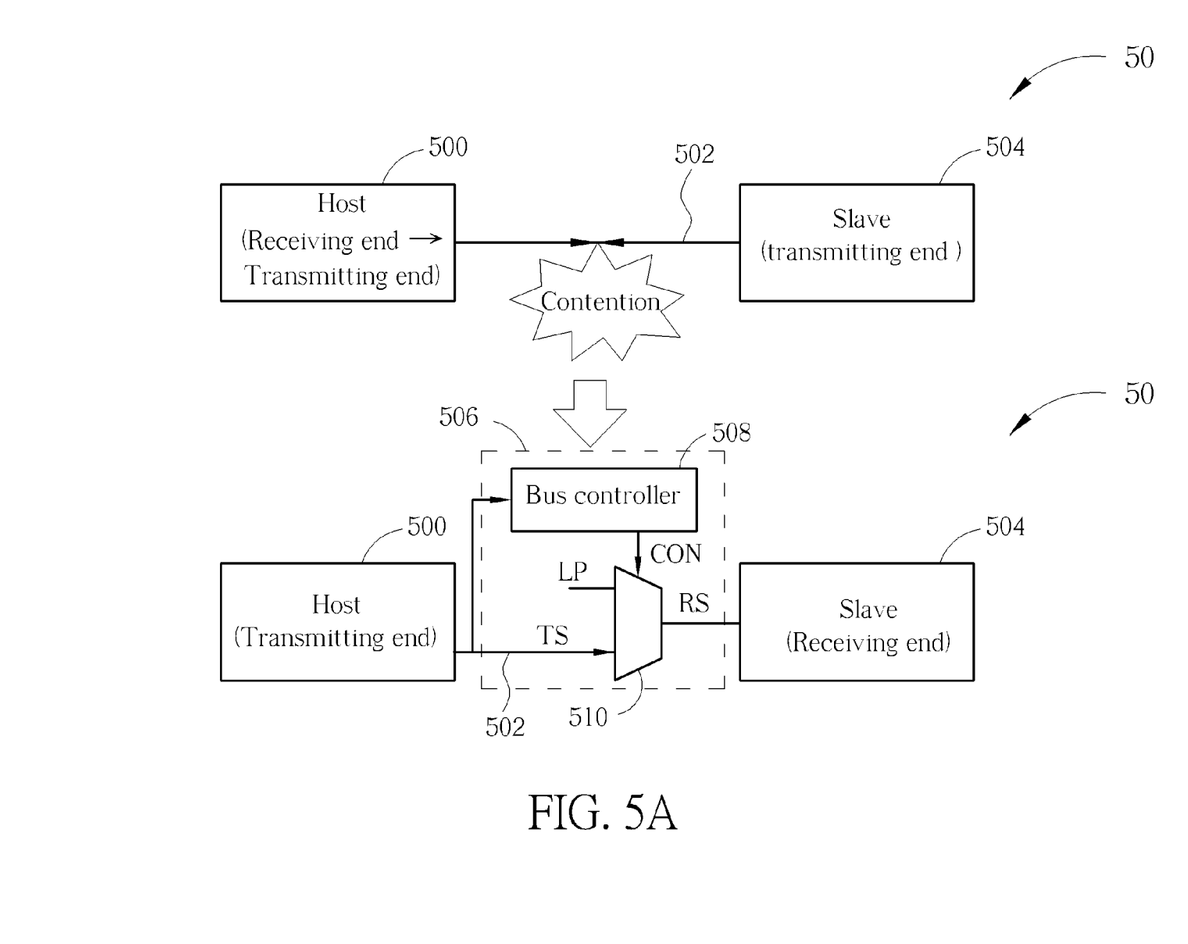
FIG. 5A is a schematic diagram of operations of a mobile industry processor interface system according to an embodiment of the present invention.

Please refer to FIG. 5A, which is a schematic diagram of operations of a mobile industry processor interface system 50 according to an embodiment of the present invention. As shown in the lower half of FIG. 5A, the mobile industry processor interface system 50 includes a host 500, a mobile industry processor interface bus 502, a slave 504 and a bus detection and control device 506. The bus detection and control device 506 includes a bus controller 508 and a multiplexer 510. In short, the host 500 is coupled to the slave 504 with the mobile industry processor interface bus 502 for data transmission. The bus controller 508 detects statuses of the mobile industry processor interface bus 502 and the host 500 for outputting a control signal CON for the multiplexer 510, such that the multiplexer 510 outputs one of a predefined signal LP and a transmission signal TS received respectively at two input terminals as a reception signal RS of the slave 504 according to the control signal CON, wherein the predefined signal LP is corresponding to an initial state (e.g. an LP11 stop state) and the transmission signal TS is outputted to the mobile industry processor interface bus 502 by the host 500. As a result, the present invention forces the slave 504 to maintain in an initial state when a signal transmission error occurred in the mobile industry processor interface bus 502 and wait for receiving the transmission signal TS outputted by the host 500 until the host 500 also returns to the initial state, to prevent signal transmission errors.

In detail, under normal operations, the bus controller 508 detects the mobile industry processor interface bus 502 operates normally, and thus the bus controller 508 controls the multiplexer 510 to output the transmission signal TS to the reception signal RS of the slave 504 by the control signal CON. On the other hand, after the bus controller 508 detects the mobile industry processor interface bus 502 is in an error status (e.g. contention occurred in the mobile industry processor interface bus 502 in the upper half of FIG. 3B and the upper half of FIG. 5A, and in the mean time the slave 504 is switched to the initial state), the output control signal CON indicates the multiplexer 510 to switch the reception signal RS of the slave 504 to the predefined signal LP corresponding to the initial state (e.g. the transmission lines DN0, DP0 in the LP11 stop state are both with logic high in the low power transmission mode), to maintain the slave 504 in the initial state and thus prevent the slave 504 from errors due to receiving the transmission signal TS of the host 500 (e.g. the host 500 continues transmitting high-speed differential signals or undefined low power signals). Then, after the bus controller 508 detects the host 500 also enters the initial state, the control signal CON is outputted to indicate the multiplexer 510 to switch the reception signal RS of the slave 504 to the transmission signal TS outputted to the mobile industry processor interface bus 502 by the host 500, to perform normal signal transmission.

Noticeably, the spirit of the present invention is to force the slave to maintain in the initial state after detecting a signal transmission error occurred in the mobile industry processor interface and wait for receiving the transmission signals outputted by the host until the host also returns to the initial state, to prevent signal transmission errors. Those skilled in the art can make modifications or alterations accordingly. For example, the bus controller 508 may actively detect whether the host 500 enters the initial state (e.g. detect whether both the transmission lines DN0, DP0 are with logic high in the low power transmission mode) by detecting whether the transmission signal TS outputted to the mobile industry processor interface bus 502 by the host 500 corresponds to the initial state, or the bus controller 508 may also passively detect whether the host 500 enters the initial state by detecting a triggering signal outputted by the host 500 which indicates the host 500 enters the initial state, as long as the bus controller 508 is capable of detecting whether the host 500 enters the initial state. Besides, in order to prevent the host 500 from continuously transmitting the incorrect transmission signal TS for a long period, after detecting a signal transmission error occurred in the mobile industry processor interface bus 502 and the slave 504 returns to the initial state, the slave 504 may transmit a monitoring signal to the host 500 to notify the host 500 to enter the initial state.

Figure 5B:
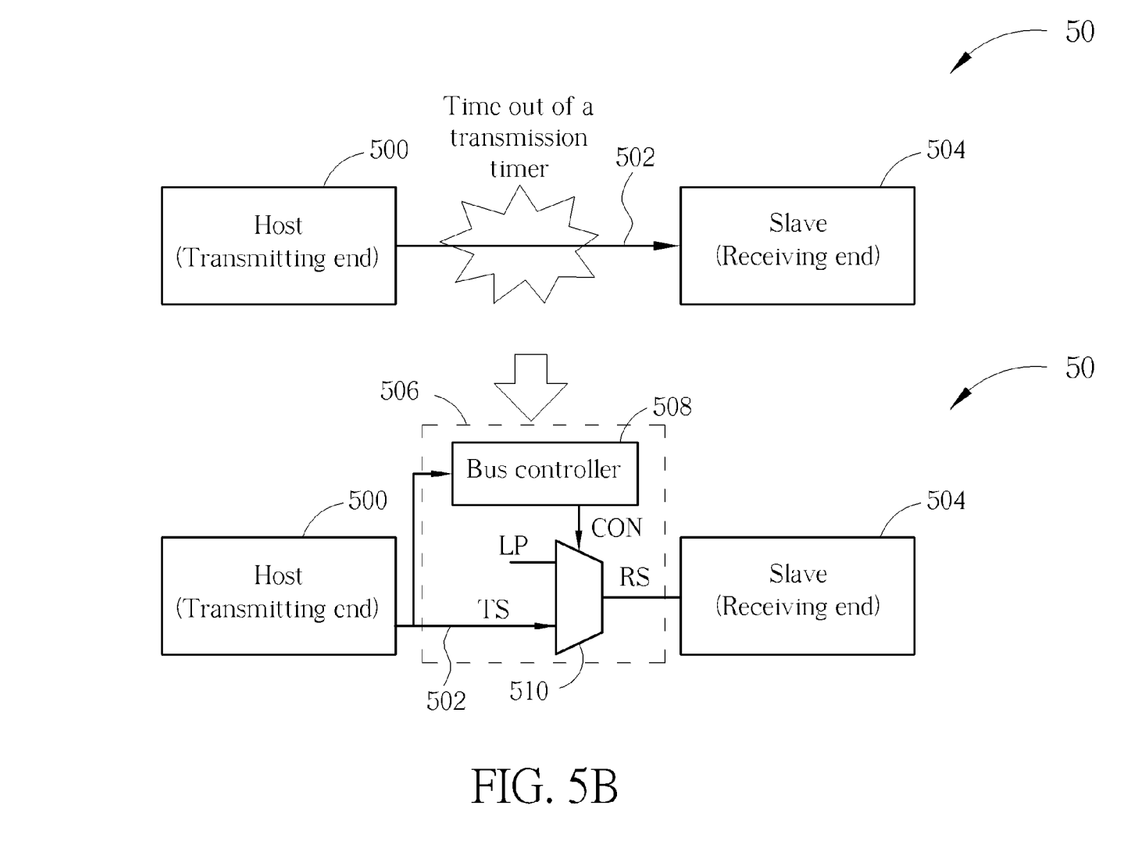
FIG. 5B is a schematic diagram of anther operations of the mobile industry processor interface system shown in FIG. 5A according to an embodiment of the present invention.

Moreover, in the embodiment shown in FIG. 5A, the bus controller 508 detects that the mobile industry processor interface bus 502 undergoes contention, and thus determines signal transmission errors occurred in the mobile industry processor interface bus 502. In other embodiments, the bus controller 508 may also perform detection by other methods and determine signal transmission errors occurred in the mobile industry processor interface bus 502. For example, please refer to FIG. 5B, which is a schematic diagram of anther operation of the mobile industry processor interface system 50 according to an embodiment of the present invention. As shown in FIG. 5B, when the host 500 still continues transmitting the transmission signal TS at time out of a transmission timer (e.g. the host 500 still continues performing high-speed transmission at time out of a high-speed transmission timer, such that the slave 504 is switched to the initial state), the bus controller 508 may also detect the mobile industry processor interface bus 502 is in an error status. Then the bus controller 508 outputs the control signal CON to indicate the multiplexer 510 to switch the reception signal RS of the slave 504 to the predefined signal LP corresponding to the initial state, to maintain the slave 504 in the initial state and avoid errors due to receiving the transmission signal TS of the host 500 (e.g. the host 500 continuing to transmit high-speed differential signals). After the bus controller 508 detects the host 500 also enters the initial state, the bus controller 508 outputs the control signal CON to indicate the multiplexer 510 to switch the reception signal RS of the slave 504 to the transmission signal TS outputted to the mobile industry processor interface bus 502 by the host 500, to perform normal signal transmission.

Figure 6:
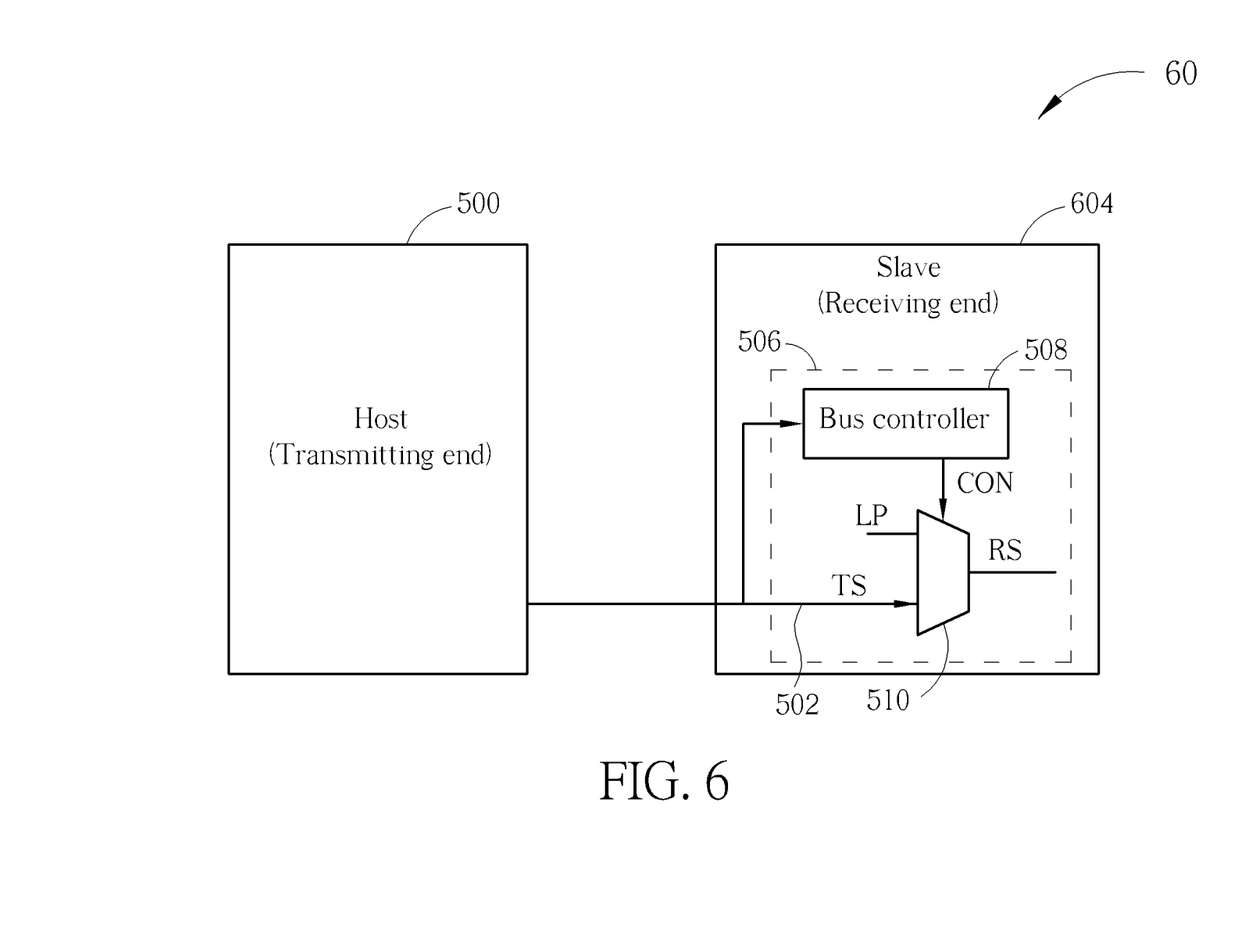
FIG. 6 is a schematic diagram of another mobile industry processor interface system according to an embodiment of the present invention.

In addition, in the mobile industry processor interface system 50 shown in FIGS. 5A and 5B, the bus detection and control device 506 is disposed outside the slave 504 (on the mobile industry processor interface bus 502) to perform related operations. However, in other embodiments, the bus detection and control device may be disposed in other places. For example, please refer to FIG. 6, which is a schematic diagram of another mobile industry processor interface system 60 according to an embodiment of the present invention. The mobile industry processor interface system 60 and the mobile industry processor interface system 50 are substantially the same, and thus elements and signals with similar functions are denoted by the same symbol. The main difference between the mobile industry processor interface system 60 and the mobile industry processor interface system 50 is that a slave 604 included in the mobile industry processor interface system 60 receives the transmission signal TS of mobile industry processor interface bus 502 outputted by the host 500 to perform partial operations (e.g. physical layer circuits performs signal processing first), and then the multiplexer 510 switches to output the reception signal RS for further operations of the following circuits of the slave 604 (i.e. the slave 604 still bases on the reception signal RS for operations of the following circuits) according to the control signal CON.

Figure 7:
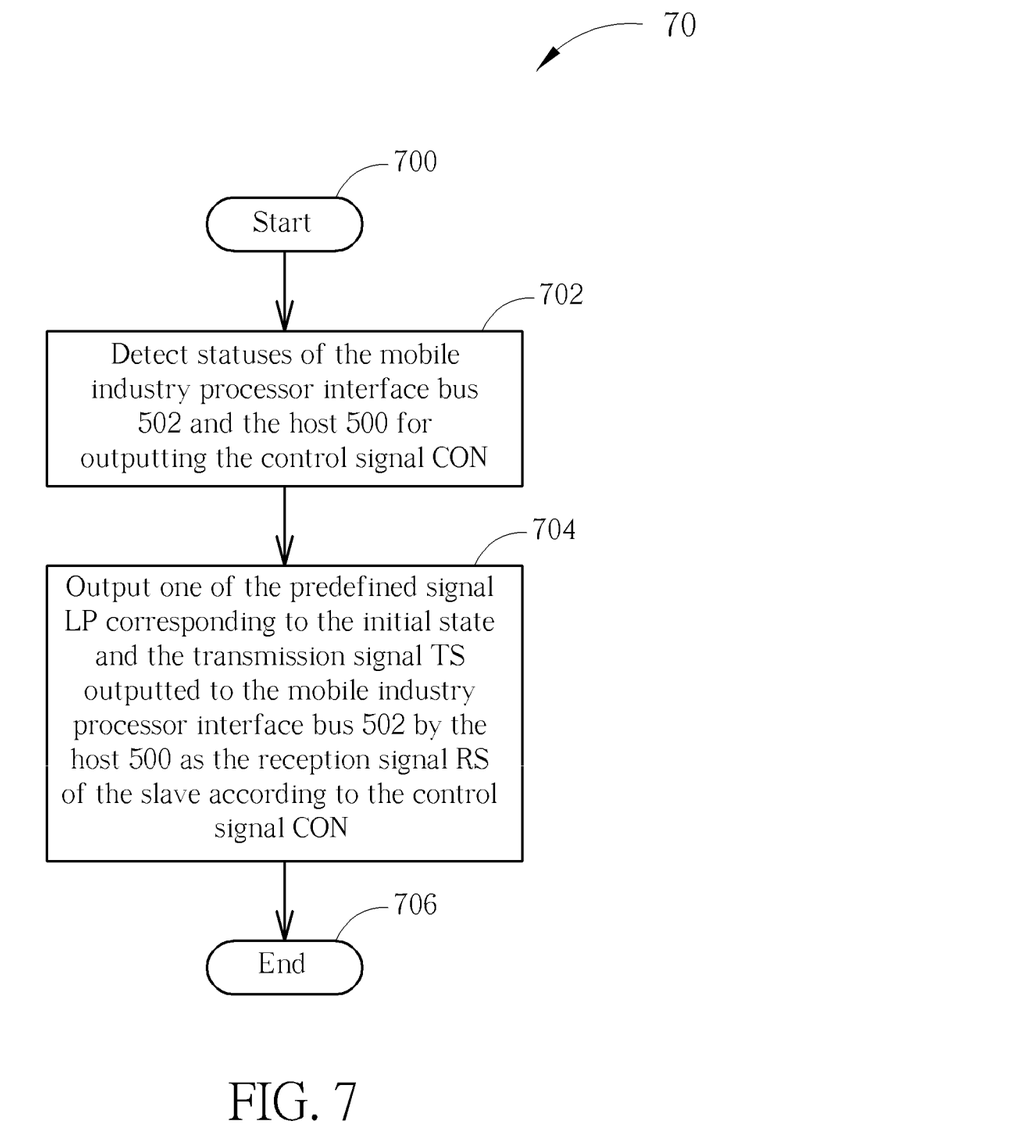
FIG. 7 is a schematic diagram of a bus detection and control process according to an embodiment of the present invention.

Therefore, the bus detection and control operations of the mobile industry processor interface system 50, 60 are summarized into a bus detection and control process 70 as shown in FIG. 7. The process includes the following steps:

Step 700: Start.

Step 702: Detect statuses of the mobile industry processor interface bus 502 and the host 500 for outputting the control signal CON.

Step 704: Output one of the predefined signal LP corresponding to the initial state and the transmission signal TS outputted to the mobile industry processor interface bus 502 by the host 500 as the reception signal RS of the slave according to the control signal CON.

Step 706: End.

For details of the bus detection and control process 70, please refer to related descriptions of the above mobile industry processor interface system 50, 60, and are not narrated hereinafter.

In the conventional technologies, a host and a slave may consider statuses (e.g. statuses of control or transmission timer) of a single mobile industry processor interface bus shared for data transmission between the host and the slave differently, which cause transmission errors. In comparison, the present invention can force a slave to maintain in an initial state after a signal transmission error occurred in a mobile industry processor interface bus and wait for receiving a signal outputted by a host until the host also returns to the initial state, to prevent signal transmission errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bus detection and control method for a mobile industry processor interface (MIPI) system, wherein a host is coupled to a slave with a mobile industry processor interface bus, the bus detection and control method comprising:

detecting statuses of the mobile industry processor interface bus and the host, to output a control signal; and     outputting one of a predefined signal corresponding to an initial state and a transmission signal outputted to the mobile industry processor interface bus by the host as a reception signal of the slave according to the control signal.

2. The bus detection and control method of claim 1 further comprising:
the control signal indicating to switch the reception signal of the slave to the predefined signal corresponding to the initial state after detecting the mobile industry processor interface bus in an error status.

3. The bus detection and control method of claim 2 further comprising:
the control signal indicating to switch the reception signal of the slave to the transmission signal outputted to the mobile industry processor interface bus by the host after detecting the host enters the initial state.

4. The bus detection and control method of claim 3, wherein the step of detecting the host enters the initial state comprises:
detecting whether the transmission signal outputted to the mobile industry processor interface bus by the host corresponds to the initial state.

5. The bus detection and control method of claim 3, wherein the step of detecting the host enters the initial state comprises:
detecting a triggering signal outputted by the host which indicates the host enters the initial state.

6. The bus detection and control method of claim 2, wherein the error status indicates that contention occurs in the mobile industry processor interface bus.

7. The bus detection and control method of claim 2, wherein the error status relates to time out of a transmission timer.

8. The bus detection and control method of claim 2 further comprising:
the slave transmits a monitoring signal to the host, to notify that the host enters the initial state.

9. The bus detection and control method of claim 1, wherein the initial state is an LP11 stop state.

10. A bus detection and control device for a mobile industry processor interface (MIPI) system, wherein a host is coupled to a slave with a mobile industry processor interface bus, the bus detection and control device comprising:
a bus controller, for detecting statuses of the mobile industry processor interface bus and the host, to output a control signal; and
a multiplexer, comprising a first input terminal receiving a predefined signal corresponding to an initial state and a second input terminal receiving a transmission signal outputted to the mobile industry processor interface bus by the host, for outputting one of the predefined signal corresponding to the initial state and the transmission signal outputted to the mobile industry processor interface bus by the host as a reception signal of the slave according to the control signal.

11. The bus detection and control device of claim 10, wherein the control signal indicates the multiplexer to switch the reception signal of the slave to the predefined signal corresponding to the initial state after the bus controller detects the mobile industry processor interface bus in an error status.

12. The bus detection and control device of claim 11, wherein the control signal indicates the multiplexer to switch the reception signal of the slave to the transmission signal outputted to the mobile industry processor interface bus by the host after detecting the host enters the initial state.

13. The bus detection and control device of claim 12, wherein the bus controller detects whether the transmission signal outputted to the mobile industry processor interface bus by the host corresponds to the initial state, to detect whether the host enters the initial state.

14. The bus detection and control device of claim 12, wherein the bus controller detects a triggering signal outputted by the host which indicates the host enters the initial state.

15. The bus detection and control device of claim 11, wherein the error status indicates that contention occurs in the mobile industry processor interface bus.

16. The bus detection and control device of claim 11, wherein the error status relates to time out of a transmission timer.

17. The bus detection and control device of claim 11, wherein the slave transmits a monitoring signal to the host, to notify that the host enters the initial state.

18. The bus detection and control device of claim 10, wherein the initial state is an LP 11 stop state.

19. A mobile industry processor interface (MIPI) system, comprising:
a slave;
a mobile industry processor interface bus;
a host, coupled to the slave with the mobile industry processor interface bus; and
a bus detection and control device, comprising:
a bus controller, for detecting statuses of the mobile industry processor interface bus and the host, to output a control signal; and
a multiplexer, comprising a first input terminal receiving a predefined signal corresponding to an initial state and a second input terminal receiving a transmission signal outputted to the mobile industry processor interface bus by the host, for outputting one of the predefined signal corresponding to the initial state and the transmission signal outputted to the mobile industry processor interface bus by the host as a reception signal of the slave according to the control signal.

20. The mobile industry processor interface system of claim 19, wherein the control signal indicates the multiplexer to switch the reception signal of the slave to the predefined signal corresponding to the initial state after the bus controller detects the mobile industry processor interface bus in an error status.

21. The mobile industry processor interface system of claim 20, wherein the control signal indicates the multiplexer to switch the reception signal of the slave to the transmission signal outputted to the mobile industry processor interface bus by the host after detecting the host enters the initial state.

22. The mobile industry processor interface system of claim 21, wherein the bus controller detects whether the transmission signal outputted to the mobile industry processor interface bus by the host corresponds to the initial state, to detect whether the host enters the initial state.

23. The mobile industry processor interface system of claim 21, wherein the bus controller detects a triggering signal outputted by the host which indicates the host enters the initial state.

24. The mobile industry processor interface system of claim 20, wherein the error status indicates that contention occurs is occurred in the mobile industry processor interface bus.

25. The mobile industry processor interface system of claim 20, wherein the error status relates to time out of a transmission timer.

26. The mobile industry processor interface system of claim 20, wherein the slave transmits a monitoring signal to the host, to notify that the host enters the initial state.

27. The mobile industry processor interface system of claim 19, wherein the initial state is an LP 11 stop state.

28. The mobile industry processor interface system of claim 19, wherein the bus detection and control device is disposed in the slave.

* * * * *